United States Patent [19]

Goolsby et al.

[11] 4,314,397
[45] Feb. 9, 1982

[54] METHOD OF MAKING A SOLAR HEAT EXCHANGER

[75] Inventors: Patrick F. Goolsby; George F. Swenck, both of Richmond, Va.

[73] Assignee: Reynolds Metals Company, Richmond, Va.

[21] Appl. No.: 148,406

[22] Filed: May 9, 1980

Related U.S. Application Data

[62] Division of Ser. No. 907,711, May 19, 1978, abandoned.

[51] Int. Cl.³ .................. B23P 15/26; B23K 31/02
[52] U.S. Cl. .................. 29/157.3 R; 228/183; 228/1 A; 228/262; 228/110; 228/38; 228/48; 165/156; 165/163
[58] Field of Search ............ 29/157.3 R; 165/145, 165/156, 163, 164, 156, 18; 126/435–437; 228/183, 38, 40, 48; 228/110, 262, 259, 1 A, 43, 36

[56] References Cited

U.S. PATENT DOCUMENTS

| | | | |
|---|---|---|---|
| 1,799,081 | 3/1931 | Blomquist | 165/164 |
| 2,146,823 | 2/1939 | Karmazin | 29/157.3 R X |
| 2,359,791 | 10/1944 | Ralston | 29/157.3 R X |
| 2,621,903 | 12/1952 | Cohler | 165/164 |
| 2,653,014 | 9/1953 | Sniader | 165/164 |
| 2,697,868 | 12/1954 | Arant | 29/157.3 R |
| 3,760,481 | 9/1973 | Greever | 29/157.3 R |
| 4,054,239 | 10/1977 | Watson, Jr. | 29/157.3 C |
| 4,112,569 | 9/1978 | Margen et al. | 29/157.3 R |

FOREIGN PATENT DOCUMENTS 224102  5/1958  Australia ............. 165/164

*Primary Examiner*—Nicholas P. Godici
*Assistant Examiner*—V. K. Rising
*Attorney, Agent, or Firm*—Lyne, Girard and McDonald

[57] ABSTRACT

A solar liquid-to-liquid heat exchanger, method of making the same, and hot water heating apparatus employing same are provided wherein such heat exchanger is comprised of a first tubular member made of a heat conductive tube material and having a plurality of turns, a second tubular member made of a heat conductive tube material and having a plurality of turns which correspond to and are fixed against the turns of the first member to provide a strong mechanical and thermal connection between immediately adjacent faces of associated member turns. The fixing of the turns of the members and utilization of the heat exchanger in a hot water heating apparatus with flow of a solar fluid used in such apparatus in one direction through the first tubular member and water to be heated through the second tubular member in counterflow to the one direction assures optimum transfer of heat from the solar fluid to the water to be heated.

6 Claims, 28 Drawing Figures

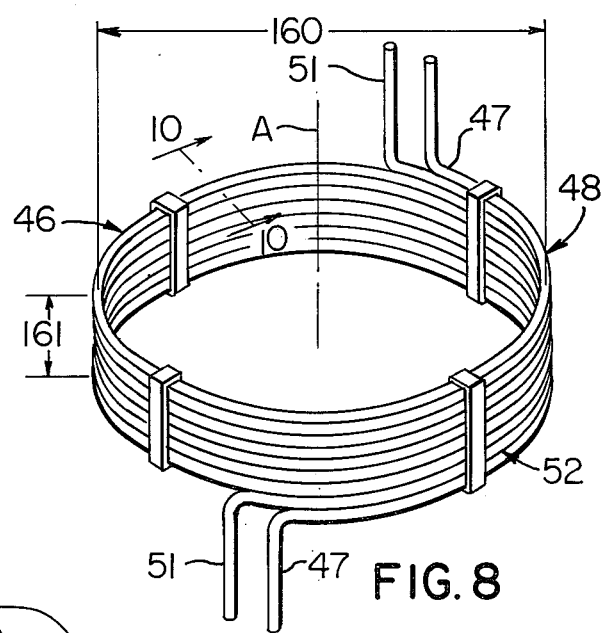
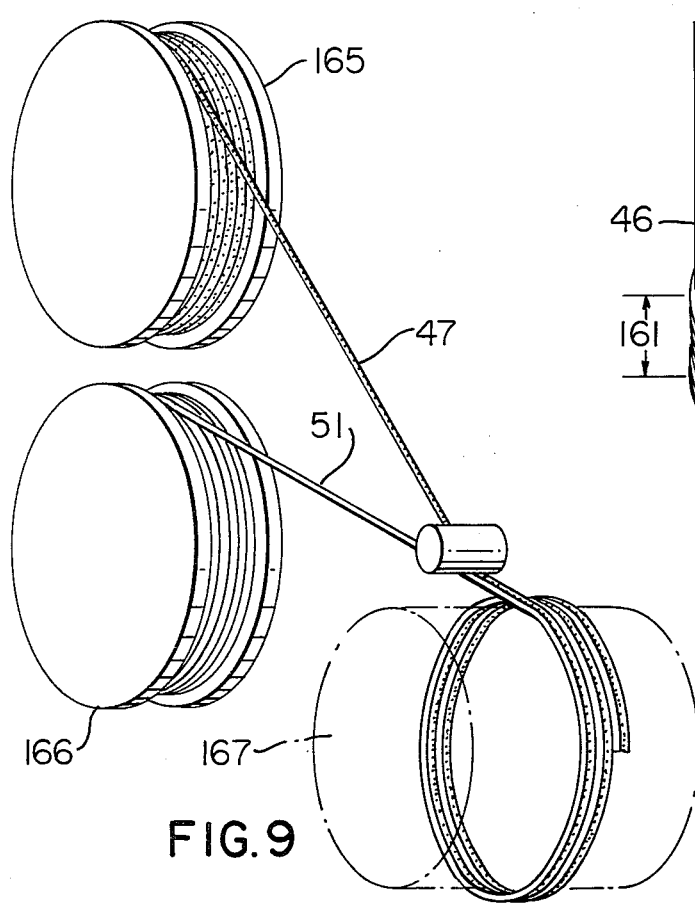
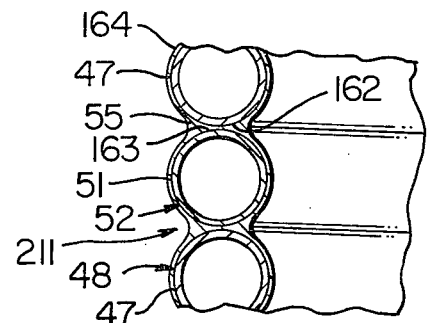
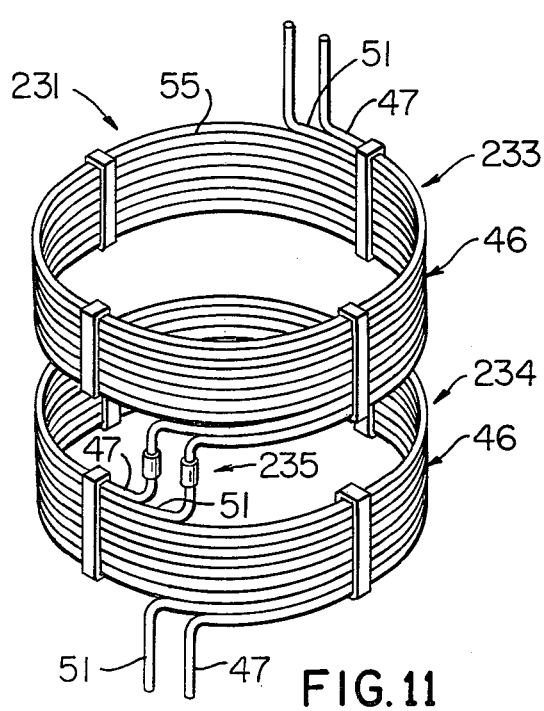
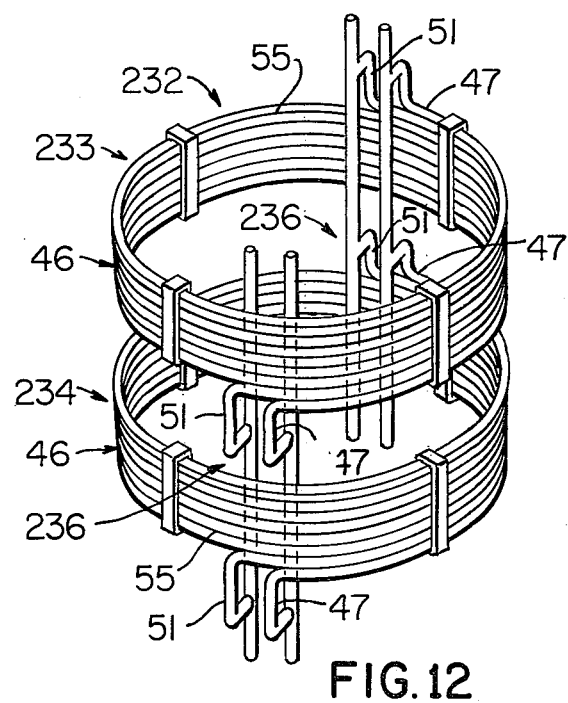

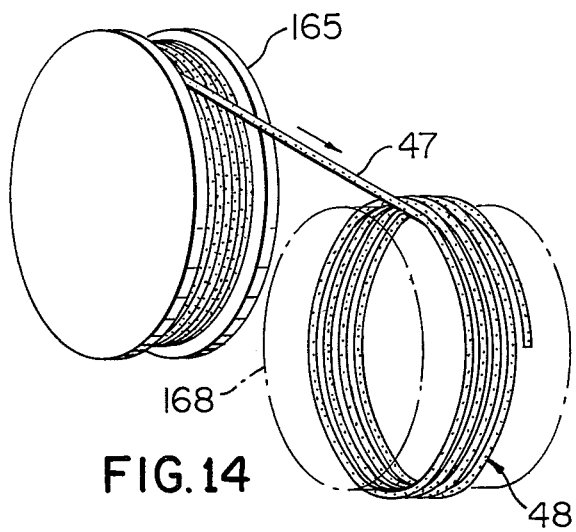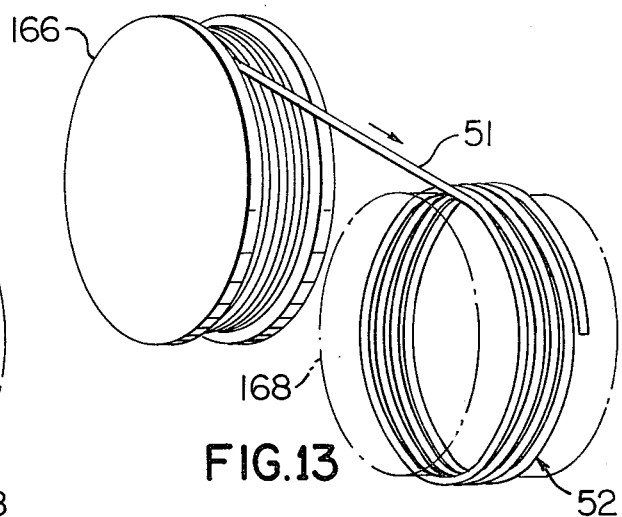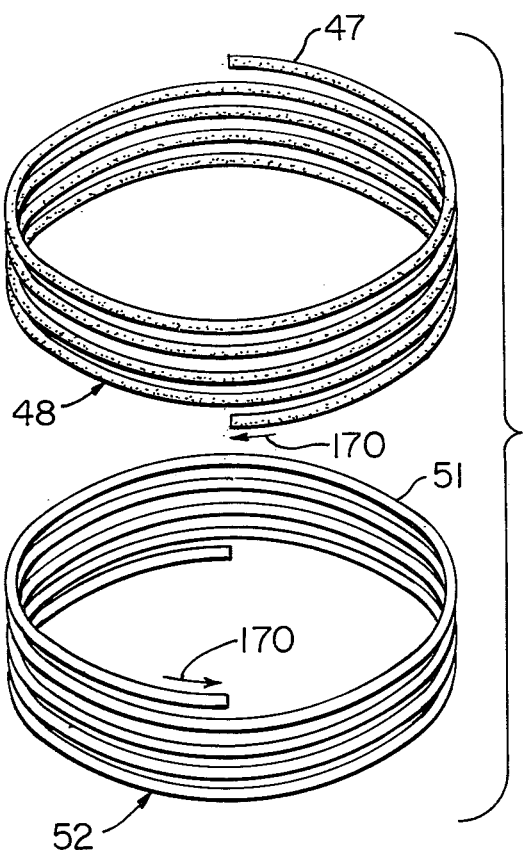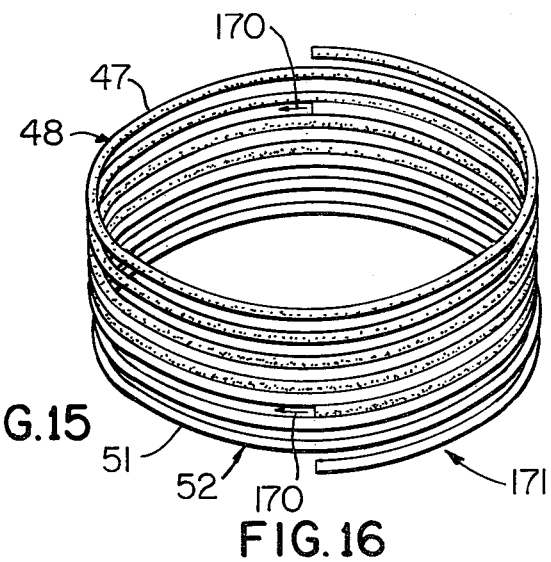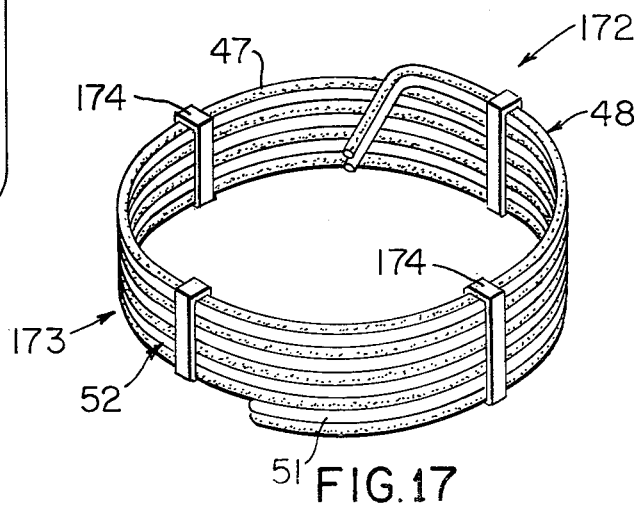

METHOD OF MAKING A SOLAR HEAT EXCHANGER

This application is a division of Ser. No. 907,711, filed May 19, 1978, now abandoned.

BACKGROUND OF THE INVENTION

This invention relates to the utilization of solar energy for the purpose of heating water.

There have been many proposals to use heat energy from the sun for various purposes including heating water for industrial use, commercial use, and domestic purposes. However, the key to providing a practical system lies in the provision of efficient means for transferring heat energy collected by solar collectors to the water being heated. Further, in order to be practical, the means employed to achieve such heat transfer should be capable of installation in an existing plumbing system; and, in each location where solar energy is not available, due to cloud cover, for most of the water heating such heat transfer means should be compatible with the existing heating system.

SUMMARY

This invention provides an improved solar liquid-to-liquid heat exchanger, method of making same, and hot water heating apparatus employing same wherein such heat exchanger is comprised of a first tubular member made of a heat conductive tube material and having a plurality of turns, a second tubular member made of a heat conductive tube material and having a plurality of turns which correspond to and are fixed against the turns of the first member to provide a strong mechanical and thermal connection between immediately adjacent faces of associated member turns. The fixing of the turns of the members and utilization of the heat exchanger in a hot water heating apparatus with flow of a solar fluid used in such apparatus in one direction through the first tubular member and water to be heated through the second tubular member in counterflow to the one direction assures optimum transfer of heat from the solar fluid to the water to be heated.

Further details and advantages of the invention will become apparent as the following description of the embodiments thereof in the accompanying drawings proceeds.

BRIEF DESCRIPTION OF THE DRAWINGS

The accompanying drawings show present preferred embodiments of this invention, in which:

FIG. 8 is a perspective view of a typical heat exchanger of the type employed in FIGS. 1-4;

FIG. 9 is a view illustrating one technique which may be employed in making the heat exchanger of FIG. 8;

FIG. 10 is a view taken essentially on the line 10—10 of FIG. 8;

FIG. 11 is a perspective view of a solar liquid-to-liquid heat exchanger assembly defined by a plurality of heat exchangers of FIG. 8 connected in series;

FIG. 12 is a perspective view of a solar liquid-to-liquid heat exchanger assembly defined by a plurality of heat exchangers of FIG. 8 connected in parallel;

FIG. 13 is a view illustrating a technique of making a first tubular coil of a first tube material to define a plurality of coil turns;

FIG. 14 is a view similar to FIG. 13 illustrating the same technique employed in making a second tubular coil of a second tube material to define a plurality of coil turns which correspond to the coil turns of the first coil;

FIG. 15 is a perspective view highlighting the manner in which the coils may be combined by, in essence, screwing such coils together;

FIG. 16 is a view showing the two coils of FIG. 15 practically completely combined or screwed together to define a coil assembly;

FIG. 17 is a view showing the two coils of FIG. 15 completely screwed together and fastened in preparation for fixing associated coil turns together by bonding same to define the heat exchanger of FIG. 8;

DESCRIPTION OF ILLUSTRATED EMBODIMENTS

Figure 1:
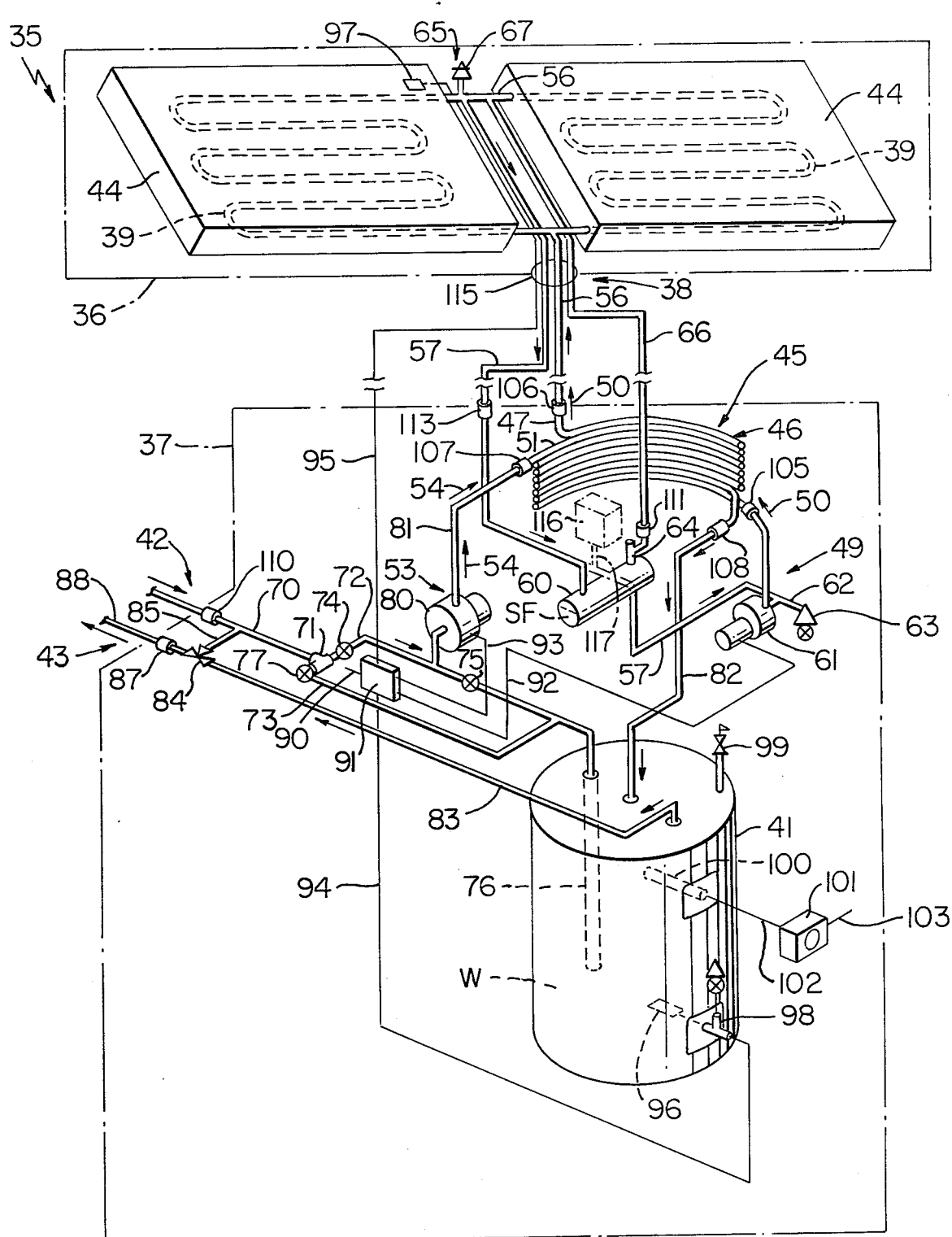
FIG. 1 is a perspective view schematically illustrating by solid lines a typical one tank solar residential hot water system of the so-called drain-down type which has a cylindrical sump for containing solar fluid upon drain down thereof and illustrating by dotted lines an expansion tank which may be used in lieu of the sump to convert the drain down system to a non drain-down system.

Reference is now made to FIG. 1 of the drawings which illustrates one exemplary embodiment of a solar hot water heating system or apparatus of this invention and such apparatus is designated generally by the reference numeral 35. The system or apparatus 35 is comprised of a solar collector subsystem or exposed roof package 36 shown by a dotted rectangle and a below roof subsystem or primarily protected package 37 shown by a dotted outline with the subsystems 36 and 37 being interconnected by conduit means or a conduit system 38 for conveying a solar fluid SF contained in associated components of the subsystems 36 and 37.

The apparatus 35 comprises a water tank 41 containing water W, a cold water supply system 42 for supplying cold water to the tank 41, and a hot water withdrawal system 43 for withdrawing hot water from the tank 41 after heaing thereof. The apparatus 35 and in particular the roof subsystem 36 of this example comprises a plurality of two solar collectors 44 each having coils 39 therein; and, the collectors 44, coils 39, and solar field SF may be of suitable types known in the art.

The apparatus 35 has heat transfer means designated generally by the reference numeral 45 and such heat transfer means comprises a solar liquid-to-liquid heat exchanger 46 of this invention for transferring heat from the solar fluid SF to the water W which is then disposed in the tank 41. The heat exchanger 46 has a first tubular coil 47 (FIG. 8) made of a first heat conductive tube material, shown with dots within the tube outline in FIGS. 9 and 13–17 for ease of presentation, and having a plurality of coil turns 48 (FIG. 14, for example) disposed in an overall tubular arrangement about a central axis A of the coil 47 and heat exchanger 46. The heat exchanger 46 also has first means 49 (FIG. 1) connecting the first coil 47 in flow communication with the solar fluid SF and providing flow of solar fluid in one direction indicated by arrows 50 through coil 47. The heat exchanger 46 also has a second tubular coil 51 (FIG. 8) made of a heat-conductive tube material and having a plurality of coil turns 52 (FIG. 13, for example) also disposed in an overall tubular arrangement coaxially with coil 47 and corresponding to the coil turns 48 of first coil 47. The heat exchanger 46 has second means 53 (FIG. 1) connecting the second coil 51 in flow communication with the water W to be heated and providing flow of water therethrough in counterflow to said one direction with such counterflow being indicated by arrows 54.

The heat exchanger 46 has means 55 (FIG. 10) fixing associated coil turns of the coils 47 and 51 together. The fixing means 55 will be described in more detail subsequently and serves to provide a mechanical connection and a thermal connection between the coil turns 48 and 52 and hence coils 47 and 51 respectively. The fixing means 55 and counterflow of water W relative to the solar fluid SF in the heat exchanger 46 cooperate to assure optimum heat transfer from the solar fluid SF to the water W which is heated in the heat exchanger 46.

As indicated earlier, the solar fluid conduit system 38 serves to convey solar fluid SF contained in associated components of the roof subsystem 36 and the below-roof subsystem 37. The conduit system 38 includes interconnected solar fluid conduits 56 from the outlet of the heat exchanger 46 to the solar collectors and interconnecting such solar collectors and interconnected solar fluid conduits 57 from the solar collectors 44 back to the inlet of the heat exchanger. The conduits 57 have a sump 60 for solar fluid suitably connected therein and also have a solar fluid circulating pump 61 connected therein so as to receive solar fluid SF from the sump 60 to the inlet of the pump 61 by gravity feed.

The pump 61 is mounted in apparatus 35 at the lowest vertical position so that it has a substantial gravity head at its inlet. In addition, the pump 61 also has a drain pipe 62 connected thereto with a drain valve 63 for solar fluid at the outlet of pipe 62.

The solar fluid system also has means for filling such system with solar fluid and such means may be in the form of a closeable fill device 64 provided in the sump 60. The solar fluid circulating system also has vent means 65 therein which enables freeing the circulating solar fluid SF of trapped air pockets while also enabling easy filling of the system. The vent means 65 is defined by a vent line 66 connected between an uppermost conduit 56 and the sump 60 with the line 66 having a suitable vent valve 67 suitably installed therein.

As indicated earlier, the apparatus 35 has a cold water supply system 42 and such system comprises a water inlet conduit 70 having a tee connector 71 provided with its leg connected to conduit 70 and a pair of conduits 72 and 73 connected respectively to opposite outlet ports of the transverse arm of the tee 71. The conduit 72 has a pair of shut-off valves 74 and 74 installed in spaced relation therealong and conduit 72 extends in flow communication with a dip tube 76 in the tank 41.

The conduit 73 extends between the tee 71 and conduit 72, being in flow communication therewith between the valve 75 and the dip tube 76. The conduit 73 has a shut-off valve 77 installed therein; and, during normal operation of the apparatus 35 the valve 77 is closed and valves 74 and 75 are open.

The apparatus 35 also has pump 80 for circulating water to be heated through the heat exchanger 46. The pump 80 is connected in a conduit 81 extending between conduit 72 and coil 51 of the heat exchanger 46. The inlet to conduit 81 is connected to conduit 72 between valves 74 and 75. Under normal operating conditions water W in the tank 41 is withdrawn through the dip tube 76 and circulated by the pump 80 through conduit 81 to the heat exchanger 46 and back from the heat exchanger through a conduit 82 into the tank 41.

As previously indicated the apparatus 35 has a hot water withdrawal system 43 and such hot water withdrawal system includes a conduit 83 in flow communication with the tank 41. The withdrawal system 43 may also include a mixing valve 84 which is connected in the conduit 83 and has a conduit 85 connecting valve 84 with inlet conduit 70 of the cold water supply system 42. The mixing valve 84 may be of any suitable type known in the art and has integral temperature control means which operates to limit the temperature of the water exiting same through a connector 87 thereof which has a conduit 88 connected thereto for conveying controlled temperature hot water to any location where it is to be used.

The apparatus 35 also has suitable control means comprised of an electrical controller 91 which is provided with electrical power from a suitable source 90 and the electrical controller 91 is operatively connected by suitable electrical leads 92 and 93 to the pumps 61 and 80 respectively. The controller is also suitably connected by leads 94 and 95 respectively to a suitable water temperature sensor 96 located within the tank 41 and a temperature sensor 97 installed on a solar collector 44. The sensors are preferably in the form of commercially available thermistors. The controller 91 operates to start the flow of water W and solar fluid SF through the heat exchanger 46 in response to a predetermined temperature differential between the temperature sensed by the sensors 96 and 97. Ordinarily the pumps 61 and 80 are started simultaneously in response to an appropriate temperature differential; however, such pumps may be started in a staggered manner.

In addition, it will be appreciated that the controller 91 may have suitable adjusting means therein which may be adjusted to set a different temperature differential between the temperature sensed by the sensors 96 and 97.

The water tank 41 is also preferably provided with a drain valve 98 for the usual purpose of draining such tank. In addition, the tank 41 is provided with a pressure relief valve 99 which serves as a safety valve protecting tank 41 against excessive pressure build-up due to excessive heating of the water W in such tank.

Because of the unavailability of the solar energy due to cloud cover, or the like, at certain times in the use of the apparatus 35, such apparatus may be provided with a backup heating system and such backup heating system may be in the form of electrical heating and water temperature sensing device 100. The device 100 may be suitably operatively connected to and controlled by a control apparatus 101 which is connected by leads 102 to the device 100 which is in turn supplied by electrical power from a suitable power source 103. The water temperature sensing portion of device 100 operates to sense the temperature of the water in the tank 41 and if such temperature is below a predetermined set limit a heating element portion thereof is energized by electrical power provided thereto through the controller 101 to heat the water W to the predetermined temperature set on device 100. The device 100 is correlated with the controller 91 such that device 100 only operates when solar energy is not available to heat water W in the tank 41.

The heat exchanger 46 is of optimum versatility and has a plurality of connectors provided in the coils thereof and such connectors include an inlet connector 105 to the solar fluid coil 47 and an outlet connector 106 from such coil. In addition, the heat exchanger 46 has an inlet connector 107 to the water coil 51 and an outlet connector 108 from such coil. The connectors 105, 106, 107 and 108 may be suitable sleeve connectors, elbow connectors, or the like as required for the particular installation.

The cold water supply system 42 has a connector 110 in the water conduit 70 and the connector 110 may be provided in close proximity to the connector 87. The connectors 87 and 110 may also be of any suitable type employed in the art and may be sleeve connectors, elbow connectors, or the like.

The vent means or system 65 of the solar fluid system has a connector 111 connecting the vent conduit 66 to the sump 60. The connector 111 may be of any suitable type and may comprise a part of the fill device 64. In addition, the solar fluid conduit 57 is provided with a connector 113 which is similar to the connector 106 and is provided in close proximity thereto.

The below-roof sub-system or package 37 lends itself to optimum portability and sale as a package separate from the roof sub-system 36. Toward this end, the package 37 is provided so that the connectors 106 and 113 associated with the solar fluid conduit system, connector 111 associated with the vent system, and the connectors 87 and 110 associated with the water system are readily accessible on the package 37. Further, these connectors are of the type which may have associated conduits readily installed thereto.

The system 35 illustrated in FIG. 1 is in the form of a so-called drain-down system and the solar fluid SF is a commercially available fluid having a suitable commercially available inhibitor therein. The inhibited solar fluid helps prevent corrosion of the components with which it comes into contact.

As indicated earlier, the apparatus 35 has first means 49 connecting the first coil 47 in flow communication with the solar fluid SF and providing flow of solar fluid in one direction therethrough which direction is indicated by arrows 50 and such connecting and providing means 49 comprises conduits 56 and 57, sump 60, and solar fluid circulating pump 61. Similarly, it will be appreciated that the second means 53 connects second coil 51 in flow communication with water W and provides flow of water W through coil 51. The second means 53 comprises water conduit 72, dip tube 76, water circulating pump 80, water supply conduit 81, and water return conduit 82 returning water from the coil 51 to the tank 41.

The system illustrated by solid lines in FIG. 1 is in the form of a so-called drain-down system which utilizes an inhibited solar fluid SF which has no protection against freezing. In this system, when the pump 61 is turned off the solar fluid SF drains by gravity into the sump 61 which is located in a freeze-protected position beneath a roof penetration area 115 for the solar fluid conduits 56 and 57 of the system.

However, it will be appreciated that in some applications the apparatus or system 35 may be provided as a socalled non drain-down system. In this type of system the solar fluid is of the type that will not freeze at the low ambient temperatures likely to be encountered by the solar fluid SF of such system. In this type of system instead of employing a sump 60 as illustrated in FIG. 1 the sump is replaced with an expansion tank 116 which is drawn by dot-dash lines in FIG. 1 and such expansion tank 116 is connected by a conduit 117 to the solar fluid conduit 57.

Figure 2:
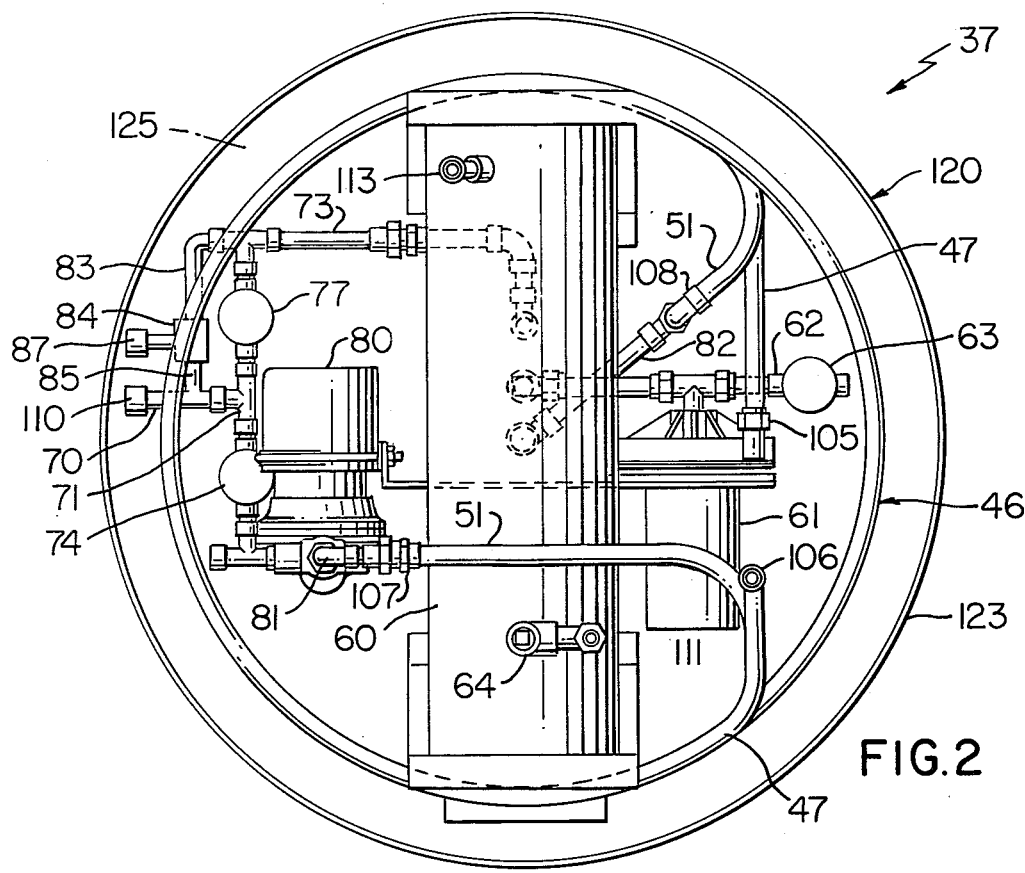
FIG. 2 is a top plan view of a typical commercially salable system package comprised of the major components minus solar collectors and certain plumbing of the drain-down type solar hot water heating apparatus of FIG. 1.
Figure 3:
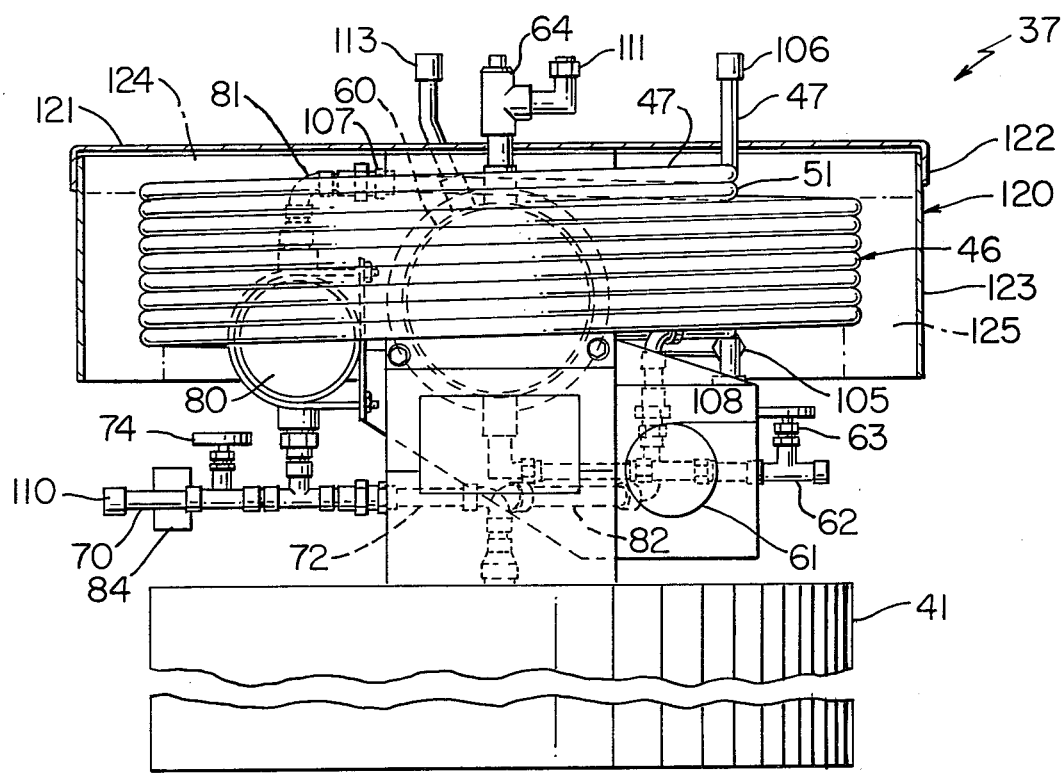
FIG. 3 is basically a side view of the package of FIG. 2 with parts in cross section, parts in elevation, and parts broken away.

As indicated earlier, the apparatus 35 may be provided in basically two packages 36 and 37 comprised of the exposed roof package 36 and the protected below-roof package 37. The package 37 comprises the key system components suitably interconnected minus the long lengths of solar fluid conduits, water conduits, and vent conduits and such key system components include the components illustrated in FIG. 1 and only certain ones of such components will be identified in FIGS. 2 and 3 for ease of presentation. In particular, the package 37 for the drain-down system comprises the tank 41, heat exchanger 46, sump 60, solar fluid pump 61, and water circulating pump 80. In addition the package 37 has connectors 106 and 113 associated with the solar fluid conduit system, the connectors 87 and 110 associated with the water circulating system, and the vent connector 111 disposed in readily accessible positions. In addition, the fill device 64 is also in a readily accessible position.

The package 37 may be provided with a suitable protective shroud 120 disposed over the heat exchanger 46 and such shroud is comprised of a disc-like top portion 121 which has a depending flange 122 defined as an integral part thereof and a right circular cylindrical tubular portion 123 fixed against and within the flange 122. The shroud 120 is arranged such that it protects the pumps, heat exchanger, valves, and sump and such shroud may be provided with insulation 124 in the top portion thereof and insulation 125 adjoining the cylindrical portion 123. The shroud 120 is readily removable for quick access to the above-mentioned key components and adjoining parts. The package 37 may also have the controller 91, leads 94–95, and thermistors 96 and 97 provided as an integral part thereof, if desired.

The non drain-down system may be similarly provided as a pair of packages 36 and 37. The package 37 for such a system is very similar to the package 37 shown in FIGS. 2 and 3 with the main difference being the utilization of expansion tank 116 in lieu of the sump 60. Due to this similarity, a drawing presentation similar to FIGS. 2 and 3 will not be made.

Other exemplary embodiments of the hot water heating apparatus of this invention are illustrated in FIGS. 4 and 5–7 of the drawings. The apparatus illustrated in FIGS. 4 5–7 are similar to the apparatus 35; therefore, such apparatus will be designated by the reference numerals 35A and 35B respectively and representative parts of each apparatus which are similar to corresponding parts of the apparatus 35 will be designated in the drawings by the same reference numerals as in the apparatus 35 (whether or not the component parts are mentioned in the specification), followed by an associated letter designation, either A or B and not described again in detail. Only those component parts of each apparatus which are different from corresponding parts of the apparatus 35 will be designated by a new reference numeral also followed by the associated letter designation and described in detail.

Figure 4:
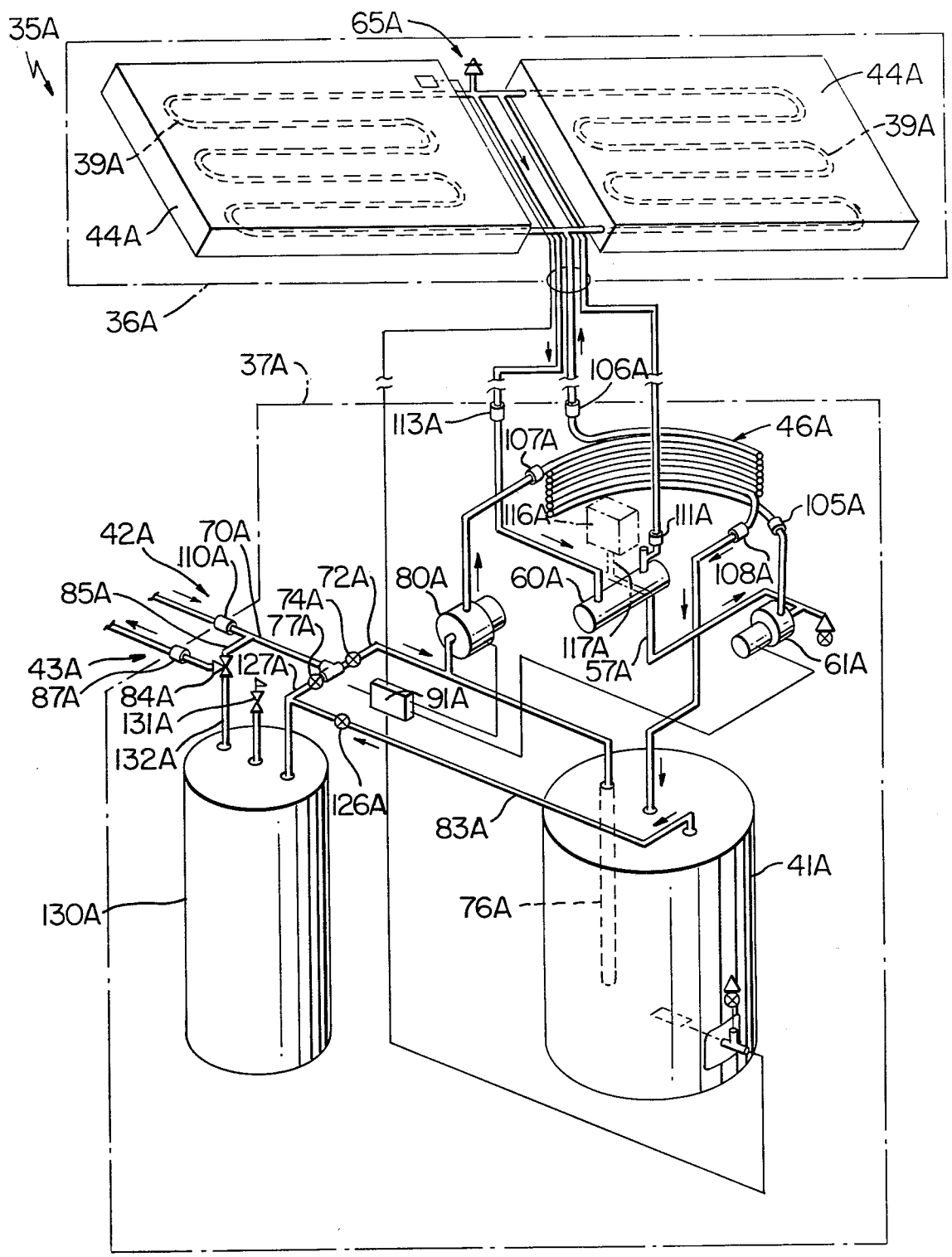
FIG. 4 is a view similar to FIG. 1 illustrating a typical two tank hot water heating apparatus comprised of a conventional hot water heater used in combination with a solar heating system as disclosed in FIG. 1.

The main differences between the apparatus 35A of FIG. 4 and the apparatus 35 of FIG. 1 are that a shut-off valve is not provided in the water conduit 72A between the water pump 80A and the dip tube 76A. It will also be appreciated that a conduit portion equivalent to conduit 73 is not provided and instead a conduit section 127A is provided and extends from valve 77A in flow communication with conduit section 83A. In addition, a shut-off valve 126A is provided in conduit 83A of the hot water withdrawal system 43A. In normal operation valve 77A is closed and valves 74A and 126A are open.

The apparatus 35A also differs from apparatus 35 in that it is minus the electrical device 100, its control 103 and associated components. Instead, a backup or supplementary heating system is provided in the form of a conventional hot water heater 130A which has its own control system (not shown) which may be of any suitable type known in the art.

The conventional hot water heater 130A is provided as a part of the hot water withdrawal system 43A; and the heater 130A may be heated by electricity, natural gas, or the like. The heater 130A may also be provided with a suitable pressure relief valve 131A.

The hot water withdrawal system 43A of the system 35A includes a conduit 83A, water heater 130A, and an outlet conduit 132A from the heater 130A. The withdrawal system 43A may also include a mixing valve 84A which is connected in the conduit 132A and has a conduit 85A connecting valve 84A with water inlet conduit 70A of the cold water supply system 42A.

The system 35A shown by solid lines in FIG. 4 is of the drain-down type; however, such system may be of the non drain-down type and in such instance the sump 60A thereof is replaced by an expansion tank 116A suitably connected by a conduit 117A to conduit 57A for solar fluid and in a manner as previously described.

The apparatus 35 and 35A employ heat exchangers 46 and 46A respectively wherein each heat exchanger is defined by tubular coils disposed in helical configurations so that the overall heat exchanger in each instance has a comparatively large diameter. Further, the helical coils in each instance are fixed together, in a manner to be subsequently described, so that what would ordinarily be the vertically disposed faces thereof serve as heat transfer surfaces. The substantially horizontally facing surfaces of the coils are exposed substantially to ambient air. However, it will be appreciated that the heat exchangers 46 and 46A need not necessarily be defined so as to have comparatively large diameters and as will now be described in connection with the apparatus 35B of FIGS. 5–7.

Figure 5:
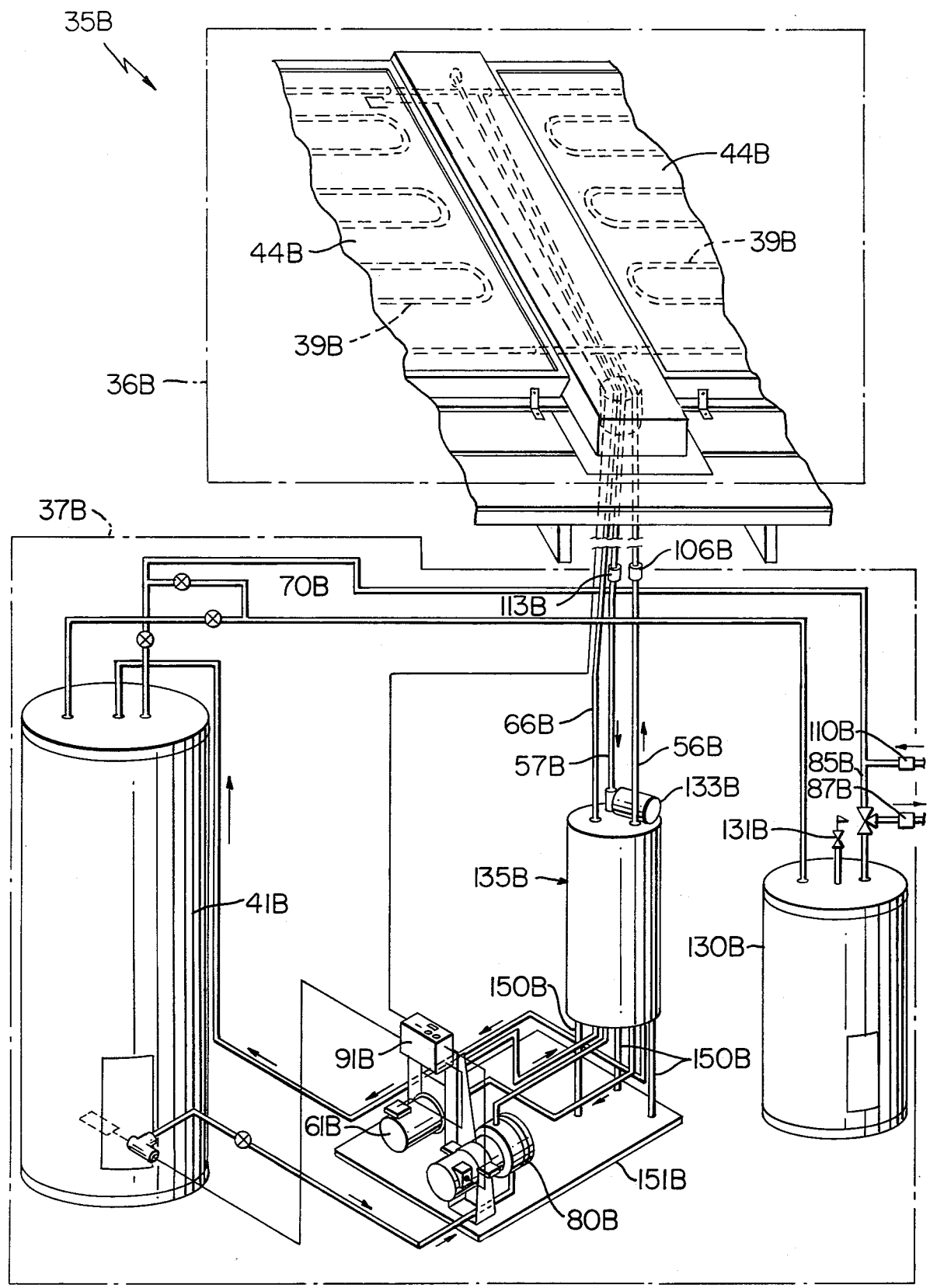
FIG. 5 is a view similar to FIG. 4 illustrating another exemplary embodiment of a two tank hot water heating apparatus.
Figures 6, 7:
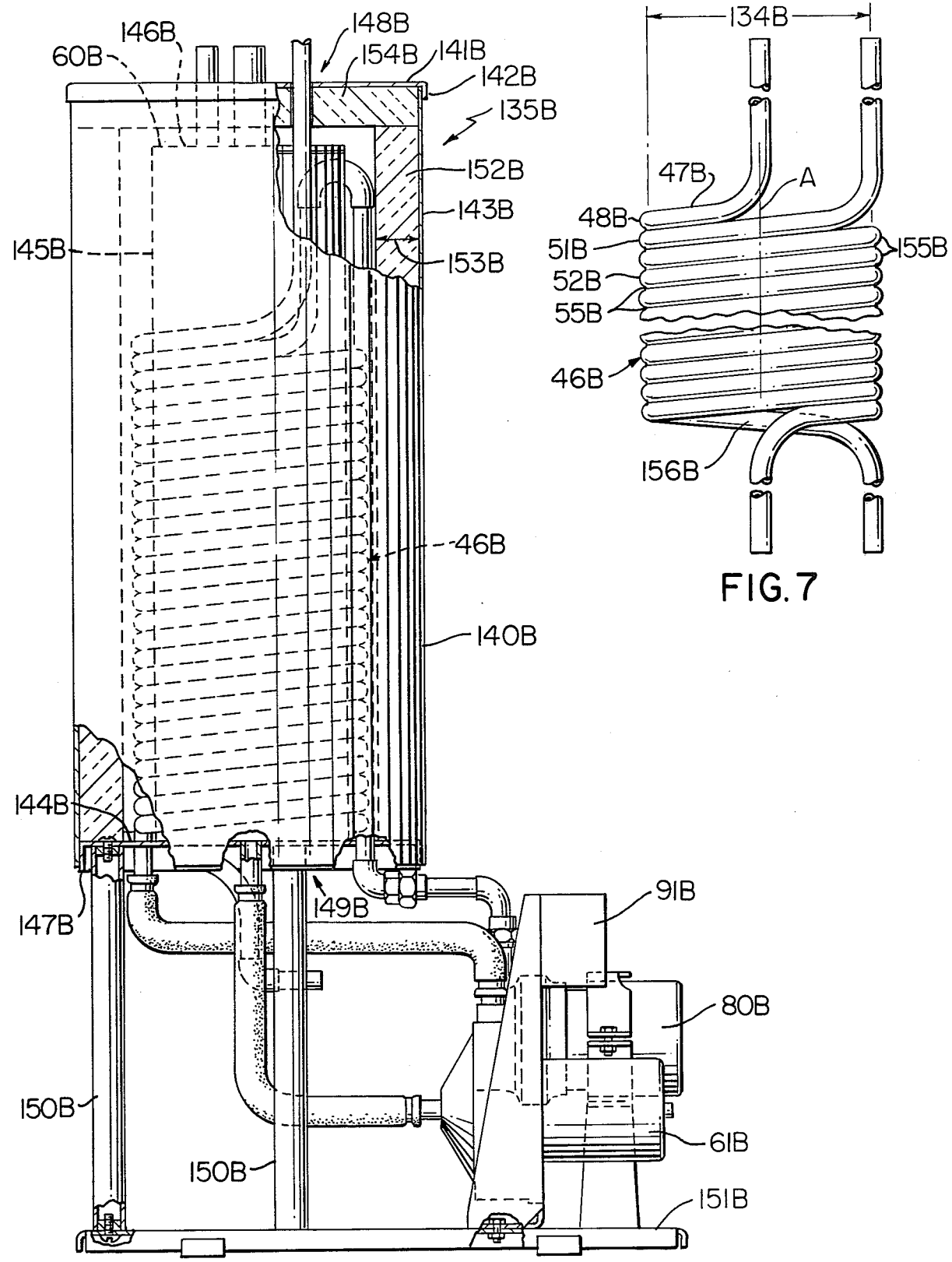
FIG. 6 is a view primarily in elevation, with parts in cross section and parts broken away showing the actual configuration of a heat exchanger-sump assembly defined by a typical solar liquid-to-liquid heat exchanger of this invention and its associated sump comprising the apparatus shown schematically in FIG. 5.
FIG. 7 is a view in elevation and with parts broken away particularly illustrating details of the heat exchanger employed in the heat exchanger-sump assembly of FIG. 6.

The apparatus 35B of FIGS. 5–7 is of the drain-down type and also utilizes a conventional hot water heater 130B. The apparatus 35B appears in the drawings to be different from the apparatus 35A. However, except for plumbing and placement of certain system components, the main differences between the apparatus 35B and the apparatus 35A are in the utilization of a commercially available solar fluid inhibitor cartridge device 133B in the solar fluid conduit system, the provision of the heat exchanger 46B defined by a plurality of two tubular coils 47B and 51B arranged and fixed together in a comparatively small nominal diameter 134B (FIG. 7) helical pattern, and the provision of the heat exchanger 46B as part of a sump-heat exchanger assembly 135B.

The heat exchanger 46B, except for the outside diameter and longitudinal height thereof, is substantially identical to the heat exchangers 46 and 46A. Accordingly, for ease of presentation a detailed description will only be presented subsequently herein in connection with the heat exchanger 46 and method of making same and such description is substantially fully applicable to all heat exchangers. Thus, the heat exchanger 46B will not be described in detail.

The sump-heat exchanger assembly 135B of the package 37B utilizes the volume within the tubular coils of the heat exchanger 46B for the dual purpose of conserving space in the overall package 37B while simultaneously using the heat of the solar fluid SF in the sump to provide further heating of the water circulating through the coil 51B of the heat exchanger 46B. In particular, it will be seen that the sump 60B is in the form of a right circular cylindrical tubular container which is disposed on one of its ends within the inside diameter of the coils of the heat exchanger 46B.

The sump-heat exchanger assembly 135B is defined by an outer housing structure 140B comprised of a disc-like circular top member 141B having a depending integral peripheral flange 142B and having a right circular cylindrical tubular body 143B suitably fixed to the inside surface of the flange 142B as by welding, or the like. The assembly 135B also has a disc-like bottom member 144B which defines a flat bottom wall of the sump 60B with such sump having a tubular side wall 145B fixed at its bottom edge in a sealed manner to member 144B and with sump 60B having a top wall 146B fixed in a sealed manner to the top edge of side wall 145B. The member 144B has an integral downwardly depending peripheral flange 147B which is fixed to the bottom edge portion of the tubular member 143B. The assembly 135B also has suitable openings therethrough indicated at 148B at the top and 149B at the bottom for the solar fluid conduits, water conduits, and solar fluid vent conduit, and the assembly 135B also has a plurality of legs 150B fixed to member 144B for supporting the assembly on an associated support, such as a support plate 151B, or the like.

The assembly 135B has suitable thermal insulating means provided therearound; and, such insulating means may be in the form of a tubular insulating member 152B having a substantial thickness 153B and a top insulating member or disc 154B disposed above the heat exchanger 46B and sump 60B. The heat exchanger 46B has immediately adjacent vertically disposed surfaces or faces of the coil turns respectively fixed together by the fixing means 55B and such fixing means serves as a mechanical and thermal connection therebetween. This construction leaves only substantially horizontally facing outwardly convex surface portions 155B facing away from the central longitudinal axis A of the heat exchanger 46B and similar horizontally facing convex surfaces 156B facing substantially horizontally and inwardly toward the axis A.

The substantially vertically disposed surfaces or faces of heat exchanger 46B are fully effective in performing a conductive heat transfer function and with the coil turns 48B and 52B vertically stacked and joined there is minimum heat loss through such vertical surfaces. The surfaces 155B and 156B, if exposed to ambient, would ordinarily result in heat loss areas. However, by using the heat exchanger 46B as a component of assembly 135B the loss from the surfaces 155B is kept at a minimum and substantially eliminated by the insulating members 152B and 154B. Likewise, loss from the surfaces 156B is substantially eliminated due to the sump 60B containing hot solar fluid SF being disposed immediately adjacent surfaces 156B, whereby the assembly 135B is of optimum compactness and transfers heat from the solar fluid SF to water W being heated in an optimum manner.

The package 37B of apparatus 35B may also be provided with cartridge device 133B of conventional construction and such device may be supported on the assembly 135B as illustrated in FIG. 5. The device 133B is a commercially available device containing an inhibitor for the solar fluid SF and such inhibitor may be of any suitable type known in the art for the purpose of the preventing corrosion in the conduit system and components associated with the solar fluid SF.

The apparatus 35B illustrated in FIG. 5 is of the drain-down type. However, it will be appreciated that such system may be suitably modified in a similar manner as described in connection with the apparatus 35A to provide an apparatus of the so-called non drain-down type, if desired.

Having described several embodiments of the system or apparatus of this invention as well as several embodiments of the roof and below roof packages of such apparatus plus the sump-heat exchanger assembly 135B of package 37B, the description will now proceed with a more detailed description of the solar liquid-to-liquid heat exchanger of this invention. For ease of presentation this description will proceed with the description of only the heat exchanger 46 and method of making same; however, it is to be understood that this description of the heat exchanger 46 and method of making same is fully applicable to all embodiments of the heat exchanger disclosed herein.

Referring now to FIG. 8 of the drawings, it is seen that the heat exchanger 46 has a substantially large nominal diameter 160 as compared to its axial height 161 along the axis A whereby such diameter is several times its axial height. As described earlier the heat exchanger 46 has its first tubular coil 47 made of a heat conductive material and such coil has its coil turns 48 disposed in a tubular arrangement about axis A. The second tubular coil 51 is also made of a heat conductive tube material and the coil 51 has its coil turns 52 also disposed in a tubular arrangement about axis A; and, the coil turns 52 correspond to the coil turns 48 of coil 47.

As mentioned earlier, the fixing means 55 (FIG. 10) fixes associated coil turns of the coils 47 and 51 together and such fixing means provides a mechanical and thermal connection between immediately adjacent faces 162 and 163 of associated coil turns. It will also be appreciated that in addition to the fixing means fixing adjacent faces 162 and 163 of associated coil turns, such fixing means may be in the form of solder means or solder 55 which also completely surrounds the coil turns 48 and 52 as shown at 164 in FIG. 10. The solder 55 may have a conductive heat transfer coefficient which is better than the heat transfer coefficient of the material from which each coil 47 and 51 is made to thereby further improve the heat transfer efficiency of the tubular heat exchanger 46.

The coils 47 and 51 are helical coils wound on the same pitch. Further, the coils 47 and 51 are made of tube material having substantially the same physical dimensions, such as inside diameter, outside diameter, and wall thickness whereby the coils 47 and 51 have the same inside diameter, outside diameter, and pitch and are readily combined, as will be described subsequently, to define heat exchanger 46.

The coil 47 is made of a heat conductive tube material also designated by the same reference numeral 47 and the material for coil 47 may be an aluminous material. The coil 51 is also made of a heat conductive tube material also designated by the same reference numeral 51 and the material is ordinarily a material other than an aluminous material but may also be an aluminous material. Ordinarily the coil 51 is associated with the water system and is made of non-aluminous material such as copper and occasionally a ferrous material such as steel or iron. For this disclosure the coil 47 will be considered as being made of an aluminum alloy while the coil 51 will be considered made of tube material consisting primarily of copper.

The helical coils 47 and 51 may be formed independently as will be described subsequently or such coils may be formed simultaneously. The simulataneous formation of coils (FIG. 9) 47 and 51 may be achieved by simultaneously unwinding tube materials 47 and 51 from their respective supply rolls 165 and 166 and suitably simultaneously winding or forming the tube material 47 and 51 around a mandrel 167, indicated by dotted lines. The coil turns 48 and 52 of coils 47 and 51 respectively are disposed in close proximity along axis A which defines the axis of the heat exchanger and such coil turns are alternately disposed. The immediately adjacent coil turns are bonded together by soldering and as will be described subsequently.

As an alternate technique coil 47 may be (FIGS. 13-14) formed independently by unwinding tube material 47 from its supply roll 165 and winding same around mandrel 168. Similarly, coil 51 may be suitably formed by unwinding tube material 51 from its supply roll 166 and winding same around mandrel 168 to thereby define two substantially identical independent coils 47 and 51. The two coils may then be suitably combined or screwed together as illustrated in FIG. 15 by the arrows 170 to initially define the partially completed heat exchanger coil assembly shown at 171 in FIG. 16 and then completely combined as shown at 172 in FIG. 17 to define a coil assembly 173. The coil assembly 173 is provided with straps or fastening members 174 suitably holding the coil turns together with any desired controlled spacing therebetween or with the coil turns against each other in preparation to fixing immediately adjacent surfaces 162 and 163 together with fixing means 55.

The mandrels 167 and 168 may be of any suitable type known in the art; and, such mandrels may be provided with appropriate grooves therein to control the pitch of their associated coils. In addition, suitable rollers or other tube forming means may be used in cooperation with the mandrels to assist in the coil forming action.

Figure 18:
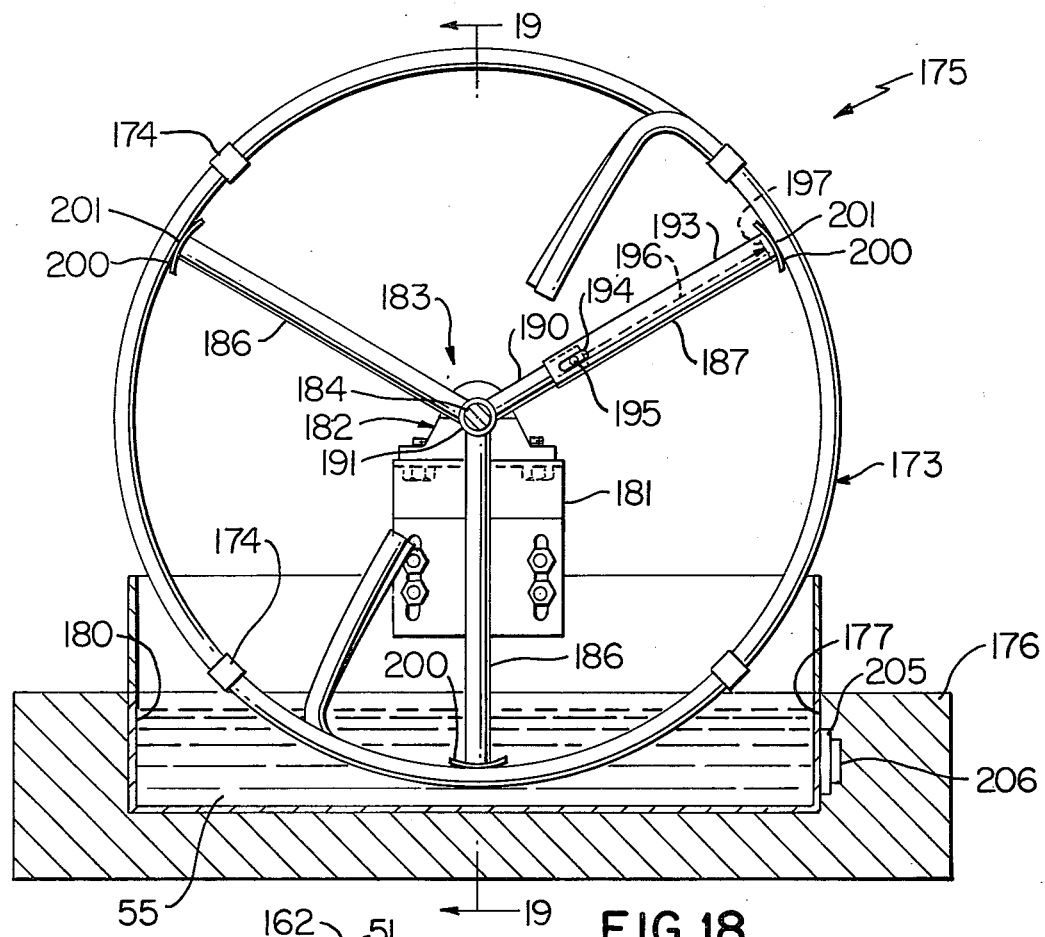
FIG. 18 is a view with parts in elevation, parts in cross section, and parts broken away illustrating an apparatus and method of this invention which may be employed in bonding the coil turns of the coils together.
Figure 19:
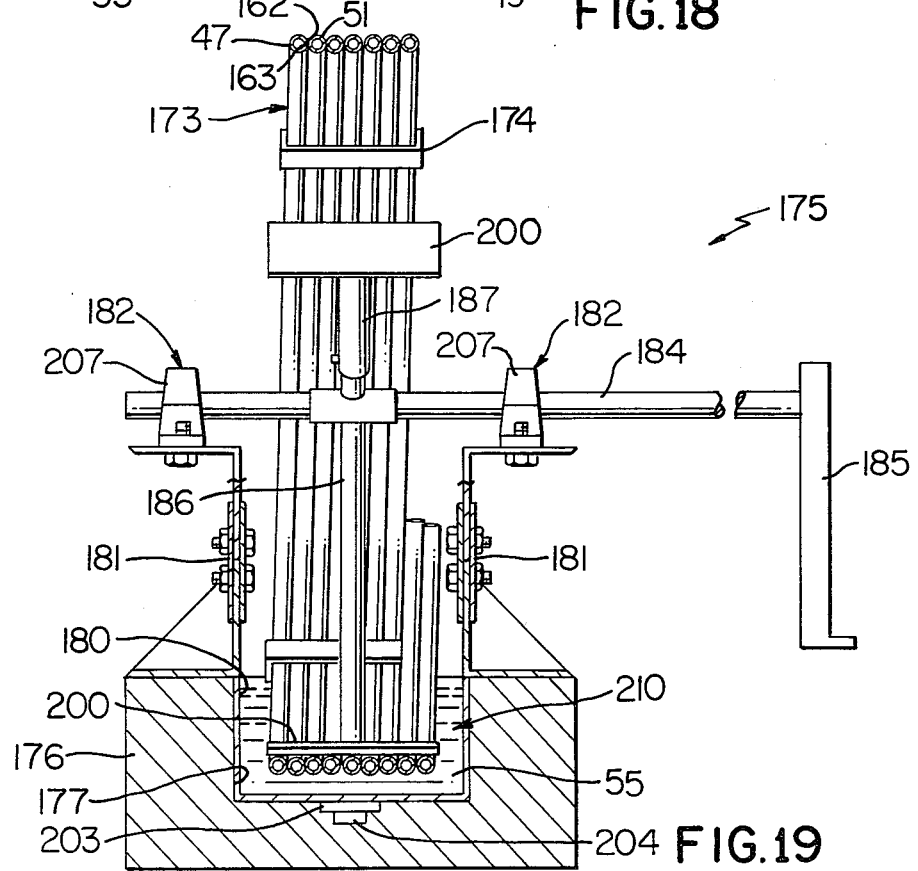
FIG. 19 is a view taken essentially on the line 19—19 of FIG. 18.

The fixing means 55 in this example comprises bonding means in the form of solder also designated by the reference numeral 55 in FIG. 10 and a bonding or soldering apparatus and method 175 illustrated in FIGS. 18-19 which is preferably used to provide the soldering action. The apparatus 175 comprises a base structure 176 having a cavity 177 therein which has a reservoir or container 180 containing hot molten solder which is also designated by the reference numeral 55. The apparatus 175 has a pair of supports 181 suitably fixed on opposite sides of the base structure and each support carries an antifriction bearing assembly 182 thereon for a purpose not to be described.

The bearing assemblies 182 rotatably support a suitable soldering fixture 183 and in particular a rotatable shaft 184 of such fixture. The shaft 184 may be rotated by any suitable automatic or manual means and in this example is rotated by a manually operated hand crank 185 suitably fixed thereto. The fixture 183 has a pair of fixed length legs 186 and a leg 187 of variable axial length. The leg 187 has a shaft portion or member 190 fixed to an inner hub portion 191 of the fixture 183. The leg 187 has a tubular member 193 disposed in telescoped relation over the shaft portion or member 190. The tubular member 193 has an elongate slot 194 extending parallel to its axis. The member 190 has a radially extending pin 195 fixed thereto and such pin extends through the slot 194. The pin 195 is provided to limit the radial outward and inward telescoping movement of the tubular member 193. The leg 187 also has a compression spring 196 indicated schematically by a dotted arrow within member 193 and such spring has its outer end engaging a disc 197 fixed in the outer end of the member 193 while the inner end of the spring engages member 190 whereby the compression spring 196 continuously yieldingly urges the member 193 outwardly.

Each leg 186 and 187 has an arcuate bearing shoe 200 fixed to its terminal outer end and the shoes 200 engage an associated coil assembly, such as assembly 173, and hold same in position to enable soldering of the coil turns thereof. The assembly 173 is easily installed in position by compressing the tubular member 193 inwardly against the action of spring 196 and upon fixing the shoes 200 of fixed-length legs against the assembly, the member 193 is slowly released allowing spring 196 to urge shoe 200 of expandable leg 187 against the assembly 173 whereby such assembly is, in essence, frictionally held in position by the three shoes 200 for soldering thereof. It should be noted that the arcuate shoes 200 provide for essentially a line contact 201 with the assembly. In addition, it will be appreciated that for smaller diameter heat exchangers, such as 46B, the legs 186 and 187 of the fixture are correspondingly reduced in length.

The apparatus 175 has a suitable solder heating means or device 203 shown schematically in FIG. 19 as a rectangular block; and, the device 203 has suitable integral control means 204 for heating and maintaining the solder 55 in container 180 at a desired temperature and as will be described in detail subsequently.

The apparatus 175 has suitable means for vibrating the entire apparatus, including an assembly 173 to be soldered, at ultrasonic frequencies; and, such frequencies are generally in the range of twenty thousand to forty thousand cycles, i.e., 20 k Hz to 40 k Hz, and thus may be considered generally of the order of 30 k Hz. In addition, ultrasonic vibration is preferably achieved at amplitudes ranging between 0.2 and 0.6 mils. The desired ultrasonic vibration may be achieved by any suitable ultrasonic transducer which is commercially available and such a transducer is designated by a rectangular block 205 in FIG. 18. The transducer 205 may be provided with a suitable control 206, as is known in the art. It will also be appreciated that a subassembly comprised of structure 176 with its solder container 180, heater 203 with its controls 204, and ultrasonic transducer 205 with its controls 206 may be obtained as a commercially produced unit. One example of such a unit is manufactured and sold by Blackstone Ultrasonics, Inc., Jamestown, N.Y. 14701.

In soldering a coil assembly, such as 173, to define heat exchanger 46 molten solder 55 free of flux is provided in the container 180 by the action of heater 203 and its controls. The assembly 173 is mounted on fixture 183 and rotated through the solder 55 by the hand crank 185. This rotation is achieved with the solder and assembly undergoing ultrasonic vibration as produced by the device 205 and its control.

The solder 55 which is preferably used will depend upon the materials being soldered. In this example of the invention, with the coil 47 being made of an aluminous material and the coil 51 being made primarily of copper, satisfactory results have been obtained utilizing a zinc-aluminum solder containing 95 parts zinc and 5 parts of aluminum.

Prior to mounting the coil assembly 173 on the soldering fixture 183 such assembly is suitably degreased and cleaned and ultrasonic energy may be used for this purpose. The coil assembly 173 is then suitably preheated and this may be achieved in an oven or other means until the temperature of such assembly is between roughly 725° F. and 800° F.

The assembly 173 is then mounted on fixture 183 and supported on bearing assemblies 182 which may have hinged top portions 207 to facilitate quick and easy supporting of shaft 184 thereon. Prior to installation of fixture 183 on bearing assemblies 182 the solder 55 in container 180 is preheated to a temperature roughly between 750° F. and 800° F. and the amount of molten solder 55 in container 180 is kept such that the lower portion of the coil assembly is submerged a couple of inches as shown at 210. With the coil assembly 173 thus submerged it is continuously rotated by hand crank 185 and with the ultrasonic transducer 205 continuously energized until the coil turns of the coils 47 and 51 comprising assembly 173 are completely soldered at their immediately adjacent faces 162 and 163.

At this point the soldered heat exchanger may be removed; however, in applications where it is desired to increase the fillet between coil turns as shown at 211 in FIG. 10 the heat exchanger 46 may be reinstalled in bearing support assemblies 182 and resubmerged at its lower portion in hot molten solder at 750°–800° F. and the same procedure as described earlier followed either with or without ultrasonic vibration.

The above-described technique allows soldering of coil turns without requiring soldering flux. In addition, the ultrasonic vibration of the coil turns 48 and 52 in the hot molten solder 55 produces cavitation and freshly cleaned surfaces free of oxides, or the like, which assure tenacious bonding of solder thereagainst even though different materials such as copper and aluminum are being soldered and even though the solder 55 is being provided without or free of flux.

It will also be appreciated that this fixing or bonding of coil turns by flux-free solder 55 provides a high strength mechanical connection, a thermal connection which is highly conductive, and a shield defined by the solder thickness 164 for the coil turns and particularly the immediately adjacent surfaces of associated coil turns provided with the fillets as shown at 211 in FIG. 10. This shield 164 assures that the heat exchanger 46 even when subjected to corrosive environments such as corrosive ambient atmospheres or corrosive water will not be attacked thereby and there will be minimum or no galvanic action between coils such as 47 and 51 made of dissimilar materials.

The coils 47 and 51 are disposed in an overall tubular arrangement and are in the form of helical coils having right circular cylindrical configurations whereby the overall heat exchanger 46 has a corresponding right circular cylindrical configuration; however, it will be appreciated that the overall heat exchanger of this invention may have other configurations and such other configurations will now be described in detail in connection with the embodiments of heat exchangers of FIGS. 20–23 and the coils or curved members and fixing or bonding means fixing such members together with such fixing means and members or coils being given the same reference numerals as in heat exchanger 46.

Figure 20:
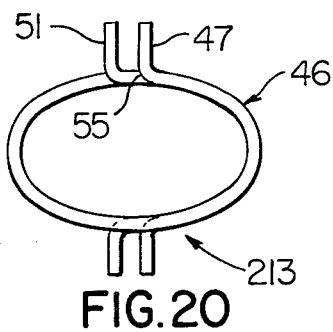
FIG. 20 is a plan view illustrating another exemplary embodiment of a heat exchanger of this invention having a tubular overall configuration and having an outer cross-sectional outline on any plane perpendicular to its longitudinal axis which is substantially elliptical.

The heat exchanger 46 of FIG. 20 is comprised of a pair of coils 47 and 51 bonded together by solder 55 to define a tubular heat exchanger 46 having a noncircular outside cross-sectional or plan view configuration which is substantially elliptical as shown at 213 in FIG. 20.

Figure 21:
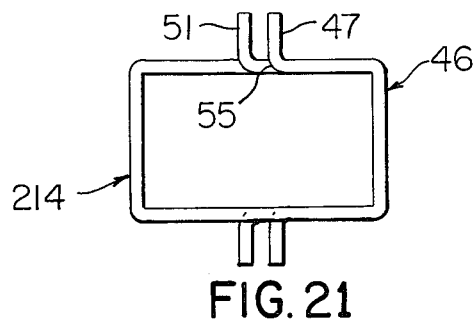
FIG. 21 is a view similar to FIG. 20 illustrating another exemplary embodiment of a heat exchanger of this invention having a tubular overall configuration and having an outer cross-sectional outline on any plane perpendicular to its longitudinal axis which is substantially rectangular.

The heat exchanger 46 of FIG. 21 is comprised of a pair of coils 47 and 51 bonded together by solder 55 to define a tubular heat exchanger having a noncircular outside cross-sectional or plan view configuration which is substantially rectangular and as shown at 214.

Figure 22:
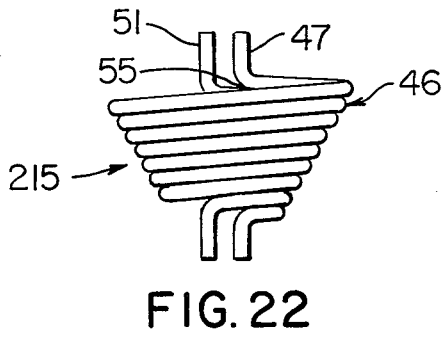
FIG. 22 is a side view illustrating another exemplary embodiment of a heat exchanger of this invention which has a frustoconical outside configuration.

The heat exchanger 46 of FIG. 22 is comprised of coils 47 and 51 formed into substantially identical spirals which are bonded together by solder 55 to define an outside configuration which is substantially frustoconical as illustrated at 215.

Figure 23:
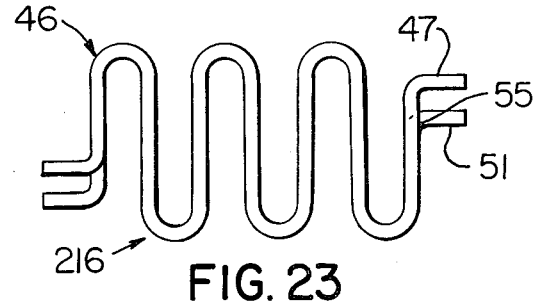
FIG. 23 is a view illustrating another exemplary embodiment of a heat exchanger of this invention which has an undulating configuration.

The heat exchanger 46 of FIG. 23 is comprised of a first tubular member 47 having a plurality of turns and a second tubular member 51 having a plurality of turns which correspond to the turns of first member 47 whereby the turns of members 47 and 51 are disposed in a flattened or planar undulating manner as shown at 216. The members are bonded together by solder 55.

Regardless of the manner in which each member 47 and 51 is shaped to define heat exchanger 46, 46A, 46B, or the like, each member or coil may be made of a tubular material which is of any desired cross-sectional shape whether circular or noncircular. Accordingly, the tubular material may be of circular tubular cross section as shown in FIG. 10.

Figure 24:
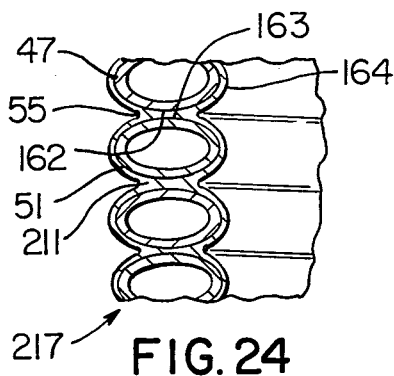
FIG. 24 is a view similar to FIG. 10 illustrating that the heat exchanger of this invention may be made of noncircular tube material which is of elliptical cross sectional outline.

In addition, the tubular material may be of noncircular tubular cross section in the form of elliptical as shown at 217 in FIG. 24 whereby associated facing surfaces 162 and 163 of the coil turns of coils 47 and 51 are bonded together by solder 55 with fillets 211 solder completely surrounding the coil turns as shown at 164.

Figure 25:
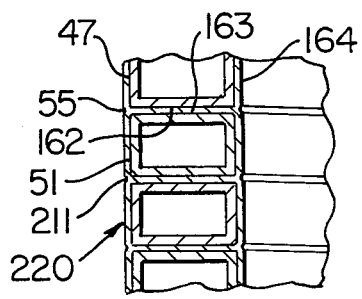
FIG. 25 is a view similar to FIG. 10 illustrating that the heat exchanger of this invention may be made of noncircular tube material which is of polygonal cross-sectional outline in the form of a rectangle.

Similarly the tubular material may have a noncircular tubular cross section which is polygonal and in the embodiment of FIG. 25 is rectangular as shown at 220 whereby associated facing surfaces 162 and 163 of the coil turns of coils 47 and 51 are bonded together by solder 55 with fillets 211 and solder completely surrounding the coil turns as shown at 164.

Figure 26:
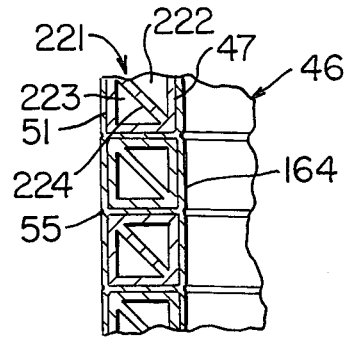
FIG. 26 is a view similar to FIG. 10 illustrating that first and second tubular members of a heat exchanger may be made of the same heat conductive tube material as a singlepiece structure having a pair of passages therethrough defined by a common integral wall bisecting the tubular cross section thereof.

The tubular materials used to define a heat exchanger 46 need not necessarily be in the form of two separate tubular members which may be made from the same material or different materials. Accordingly, FIG. 26 illustrates a first tubular member 47 and a second tubular member 51 made of the same heat conductive tube material 211 as a single-piece tubular structure having a pair of passages 222 and 223 respectively therethrough defined by a common integral diagonal wall 224 substantially bisecting the tubular cross sectional area thereof. In this embodiment the common wall 224 may be considered as comprising integral fixing means for certain ones of said associated turns of coils 47 and 51 with solder 55 comprising fixing means for others of the associated coil turns of coils 47 and 51.

Figure 28:
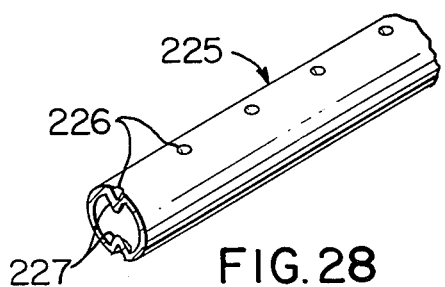
FIG. 28 is a cross-sectional view showing another embodiment of typical tube material which may be employed in making the heat exchanger of this invention.
Figure 27:
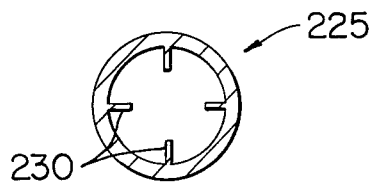
FIG. 27 is a fragmentary perspective view with parts in cross section showing typical tube material which may be employed in making the heat exchanger of this invention and with such tube material having integral turbulator means.

The tube material used to define members 47 and 51 whether in the form of coils or not may have tubulator means therein and such tubulator means is designated generally in each of FIGS. 27 and 28 by the reference numeral 225.

The tubulator means 225 of FIG. 27 is defined by a plurality of dimples 226 which are inwardly in the tube material and provide corresponding convex projections 227 toward the center of the tube material. The tubulator means 225 provides a tubulating function and improved heat transfer in a manner which is known in the art.

The tubulator means 225 may be in the form of a plurality of radially inwardly projecting fins 230 shown as a plurality of four fins in FIG. 28. The fins 230 may be defined as an integral part of the tube material or may be fins which are internally bonded or otherwise fixed within a tube material.

The tubulator means 225 disclosed in FIGS. 27 and 28 are shown in a tube of circular cross-section; however, it will be appreciated that such tubulator means may be provided in any of the tubes disclosed herein regardless of their cross-sectional configurations.

It should also be emphasized that the cross section of the tubular material employed to make the heat exchanger of this invention may be any suitable cross-section. Further, the tubulator means may be any suitable type. Likewise, the overall configuration of the heat exchanger may be any desired overall configuration including a right circular cylindrical outside configuration, elliptical outside configuration, rectangular outside configuration, conical outside configuration, or serpentine or undulating outside configuration as shown in FIGS. 7 and 10, 20, 21, 22 and 23 respectively.

The heat exchangers 46, 46A, and 46B, for example, illustrated in this disclosure of the invention are shown and described as being made of a plurality of tubular members shown as a first tubular member or coil and a second tubular member or coil. However, it will be appreciated that a plurality of heat exchangers essentially as shown may be operatively connected to define a heat exchanger assembly providing even better heat transfer performance.

For example, reference is now made to FIGS. 11 and 12 of the drawings which illustrate solar liquid-to-liquid heat exchanger assemblies 231 and 232 respectively each defined by a plurality of two heat exchangers 46 shown at 233 and 234 in each FIG. The heat exchanger at 233 in each instance comprises a first tubular coil 47 made of a heat conductive tube material having a plurality of coil turns, a second tubular coil 51 made of a heat conductive tube material and having a plurality of coil turns which correspond to the coil turns of the first coil with the first and second coils 47 and 51 having their coil turns alternately disposed and first bonding means in the form of solder 55 bonding the first 47 and second 51 coils together with the first bonding means 55 providing a mechanical connection, a thermal connection, and a shield for immediately adjacent faces of the associated coil turns of the first and second coils. The heat exchanger at 234 is comprised of a third tubular coil 47 made of a heat conductive tube material and having a plurality of coil turns, a fourth tubular coil 51 made of a heat conductive tube material and having a plurality of coil turns which correspond to the coil turns of the third coil, with the third and fourth coils 47 and 51 having their coil turns alternatively disposed and second bonding means or solder 55 bonding the third 47 and fourth 51 coils together with the second bonding means 55 providing a mechanical connection, a thermal connection, and a shield for immediately adjacent faces of the associated coil turns of the third and fourth coils.

Suitable means may be provided connecting the first and second heat exchangers 46 at 233 and 234 in flow communication to define a completed heat exchanger assembly. In FIG. 11 such connecting means comprises connector means 235 connecting the heat exchangers 46 in series to define assembly 231. In FIG. 12 such connecting means comprises connector and tubing means 236 connecting the heat exchangers 46 in parallel to define assembly 232.

The solar fluid SF used in the drain-down systems disclosed herein may be any suitable solar fluid employed in the art and such solar fluid may be provided with a suitable inhibitor, or the like, to prevent corrosion in its associated circulating system. Examples of a solar fluid and an inhibitor which have been used successfully are as follows:

Similarly, in a non drain-down system, any suitable solar fluid SF which does not freeze at low temperatures may be provided and may also have an inhibitor therein. Examples of such a fluid and inhibitor are as follows:

While present exemplary embodiments of this invention, and methods of practicing the same, have been illustrated and described, it will be recognized that this invention may be otherwise variously embodied and practiced within the scope of the following claims.

What is claimed is:

1. A method of making a tubular solar liquid-to-liquid heat exchanger comprising the steps of providing an aluminous, heat conductive tube material, forming said aluminous tube material into a substantially helical coil, providing a nonaluminous, heat conductive tube material, forming said nonaluminous tube material into a substantially helical coil, combining said substantially helical coils into a composite coil, preheating said composite coil to a temperature ranging between 725° F. and 800° F., submerging a circumferential portion of said composite coil in a bath of molten solder, rotating said composite coil about its central axis to submerge the entire composite coil in said molten solder, and ultrasonically vibrating said composite coil and said molten solder during said rotation of said composite coil therein to provide cavitation and thus ultrasonic cleaning of said composite coil and thereby assure optimum wetting and tenacious bonding by said solder of immediate adjacent faces of said aluminous and said nonaluminous coils.

2. The method of claim 1 wherein said aluminous tube material and said nonaluminous tube material are formed into substantially helical coils independently about a mandrel and said coils are screwed together to form said composite coil.

3. The method of claim 1 wherein said aluminous tube material and said nonaluminous tube material are formed simultaneously about a mandrel to form said composite coil.

4. The method of claim 1 wherein said solder is free of flux.

5. The method of claim 1 wherein sad nonaluminous tube material is copper and wherein said solder is roughly 95 percent zinc and 5 percent aluminum and is free to flux.

6. The method of claim 1 wherein said composite coil and said molten solder are ultrasonically vibrated at amplitudes ranging between 0.2 and 0.6 mils. and frequencies ranging between 20 kHz and 40 kHz.

* * * * *